United States Patent
Moore et al.

(10) Patent No.: US 6,998,083 B2
(45) Date of Patent: Feb. 14, 2006

(54) AUTOMATED FLASH REMOVAL IN GOLF BALL PRODUCTION

(75) Inventors: Thomas E. Moore, Bristol, RI (US); Thomas L. Mydlack, Rochester, MA (US)

(73) Assignee: Acushnet Company, Fairhaven, MA (US)

( * ) Notice: Subject to any disclaimer, the term of this patent is extended or adjusted under 35 U.S.C. 154(b) by 335 days.

(21) Appl. No.: 10/442,343

(22) Filed: May 21, 2003

(65) Prior Publication Data

US 2004/0232585 A1    Nov. 25, 2004

(51) Int. Cl.
B29C 37/02    (2006.01)

(52) U.S. Cl. .................... 264/161; 264/334
(58) Field of Classification Search ......... 264/161, 264/334

See application file for complete search history.

(56) References Cited

U.S. PATENT DOCUMENTS

| | | | |
|---|---|---|---|
| 4,447,373 A | 5/1984 | Chappell et al. | 264/4 |
| 4,779,387 A | 10/1988 | Reid et al. | 51/289 R |
| 5,480,607 A * | 1/1996 | Hobson | 264/161 X |
| 6,126,522 A | 10/2000 | Endo et al. | 451/50 |
| 6,387,316 B1 * | 5/2002 | Marshall | 264/511 |
| 6,846,442 B2 * | 1/2005 | Sugimoto | 264/161 |

* cited by examiner

Primary Examiner—Leo B. Tentoni
(74) Attorney, Agent, or Firm—William B. Lacy

(57) ABSTRACT

An automated flash/overflow removal system for the manufacturing of golf balls, including a gripping assembly mounted on a motion system. The gripping assembly includes a plurality of gripping members capable of clamping and releasing the flash/overflow from a golf ball mold portion.

17 Claims, 7 Drawing Sheets

AUTOMATED FLASH REMOVAL IN GOLF BALL PRODUCTION

FIELD OF THE INVENTION

This invention relates generally to the method and apparatus of golf ball production and, more particularly, to the removal of flash or overflow in molding a golf ball portion. The golf ball portion may be a golf ball core, an outer core layer, a cover, an intermediate layer between the core and the cover, an inner cover layer, or an outer cover layer.

BACKGROUND OF THE INVENTION

The United States Golf Association ("USGA") provides five (5) regulations to keep golf balls consistent. Specifically, the golf ball must weight no more than 1.62 ounces and measure no less than 1.68 inches in diameter. The initial velocity of the ball as test on a USGA machine at a set club head speed must not exceed 255 ft/sec. The overall distance of the ball as tested with a USGA specified driver at 160 ft/sec and a 10 degree launch angle must not exceed 296.8 yards. And the ball must pass a USGA administered symmetry test. Within the confines of these regulations, other performance characteristics of the ball, including distance, durability, feel, spin, sound, etc., may be modified through alterations in material compositions, constructions, diameters and/or thickness, and surface configurations of various portions of the ball, such as the core(s), cover(s), and intermediate layer(s) therebetween. Other physical, mechanical, chemical, and/or optical properties of the portions, including color stability, compression, density, flexural modulus, gas or vapor permeability, hardness, stiffness, tear resistance, weight, etc., may also be affected by these alterations.

Various portions of a golf ball, including cores, centers, outer core layers, intermediate layers, inner cover layers, and outer cover layers, are usually formed through a molding method. Suitable molding methods known to one of ordinary skill in the art include, but are not limited to, compression molding, injection molding, reaction injection molding ("RIM"), casting, or combinations thereof. A process common to these molding methods is the removal of flash or overflow attached to the molded golf ball portion that is generated during the molding process. Due to the random nature of the flash/overflow formation, and the fact that the flash/overflow volume of a golf ball mold is not filled completely to ensure quality and consistency of the molded portion, the shape and dimension of the flash/overflow are irregular and inconsistent. This in turn makes it difficult to remove the flash/overflow automatically. Conventional method of removing the flash/overflow is manual (by hand), which requires direct labor input, increases manufacturing cost, and reduces production rate. Manual removal of the flash/overflow may also inadvertently contaminate the surface of the molded golf ball portion. For example, the loose fragments of the flash/overflow may come in contact with the molded golf ball portion, adhering to or cured to the portion. Such contamination adversely affects the quality of the molded golf ball portion and the final product formed therefrom.

Therefore, a need exists for an automated method and apparatus to remove the flash/overflow from the molded golf ball portions effectively, efficiently, and reliably.

SUMMARY OF THE INVENTION

The present invention is directed to a method and apparatus for automated removal of flash/overflow from a mold portion during golf ball production. The flash/overflow is integrally attached to a molded golf ball or precursor thereof and situated on a mold portion immediately after molding. The molded golf ball or precursor thereof is removed first the flash/overflow is retained on the mold portion. This is accomplished by positioning a suction cup over the molded golf ball or precursor thereof and applying a vacuum suction to the suction cup. The molded object is picked up, but the flash/overflow is retained, thereby separated from the molded object. The suction cup holding the molded object is moved to a predetermined position, where the vacuum is removed, and the molded golf ball or precursor thereof falls under gravity into a container for collection.

To remove the retained flash/overflow from the mold portion, a gripping assembly is used, which includes at least one gripping member capable of clamping and releasing the flash/overflow. Preferably, the gripping assembly has between 2 to about 20 gripping members arranged in a one-dimensional or two-dimensional array. The gripping members are operated independently or synchronously. More preferably, the gripping assembly comprises 4 coplanar and synchronized gripping members arranged in a 2×2 array. The gripping assembly is mounted on a motion system, which moves the gripping assembly pneumatically from a starting position to an alignment position directly over the mold portion, and then lowers the gripping assembly towards the mold portion for docking. The motion system may involve one-dimensional motions, two-dimensional motions, three dimensional motions, linear motions, rotational motions, or combinations thereof.

An alignment portion at the end of the gripping member is lowered into a cavity of the mold portion so that a brink of the gripping member is pressed against a rim of the mold portion. At the same time, the gripping member is loaded with a compressed energy through a spring mechanism for later ejection of the flash/overflow. The alignment portion has a substantially spherical side surface and a substantially flat bottom surface, and fits snuggly into the cup-shaped mold cavity. Preferably, the brink and the rim are both substantially annular, and the brink is no wider than the rim. With such a construction, the gripping member can easily align and dock to the mold portion.

The gripping member also has a center clamping portion positioned inside the flash/overflow, and a plurality of perimeter clamping portions positioned about the center clamping portion and outside the flash/overflow. The center clamping portion is substantially tapered, having an outward surface with a convex curvature facing the perimeter clamping portions, to facilitate the discharge of the flash/overflow from the gripping member. The convex curvature is preferably inverted frustoconical. The plurality of perimeter clamping portions can be between 2 to 10 fingers disposed substantially uniformly about the center clamping portion. Each of the plurality of perimeter clamping portions has an inward surface with a concave curvature facing the center clamping portion. The concave curvature of the perimeter clamping portions is preferably flatter than or equal to the convex curvature of the center clamping portion. The perimeter clamping portions are moved inward pneumatically in a concentric and synchronous manner, to clamp the flash/overflow securely between the center clamping portion and the perimeter clamping portions.

The gripping assembly with the flash/overflow secured by the gripper members therein is moved using the same motion system to disengage from the mold portion and moved away therefrom to an ejection position, which can be the same as the starting position. The plurality of perimeter clamping portions is disengaged from the flash/overflow by moving outward concentrically, releasing the compressed spring mechanism which ejects the flash/overflow off the gripping member. The expelled flash/overflow then falls under gravity into a container for collection.

DETAILED DESCRIPTION OF THE INVENTION

Referring now to the figures, a discussion of the above features with respect to exemplary embodiments is provided below. It should be understood that such embodiments are for illustrative purposes, and should not be construed as limiting the scope of the invention.

Figure 1:
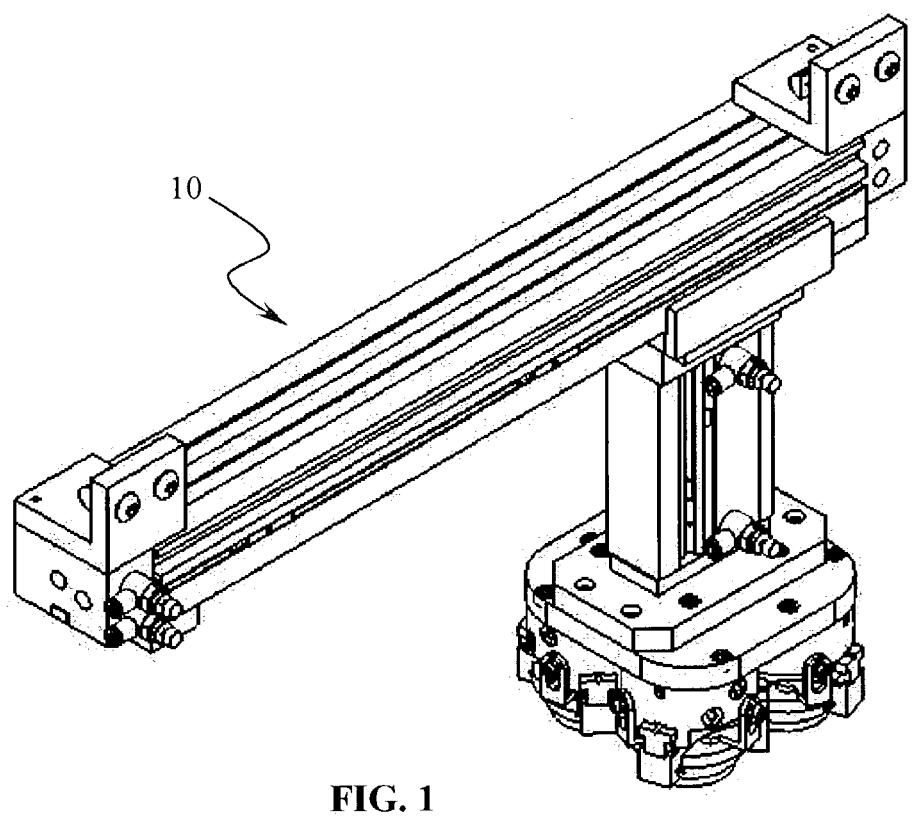
FIG. 1 is a prospective view of an automated flash/overflow removal apparatus.
Figure 2:
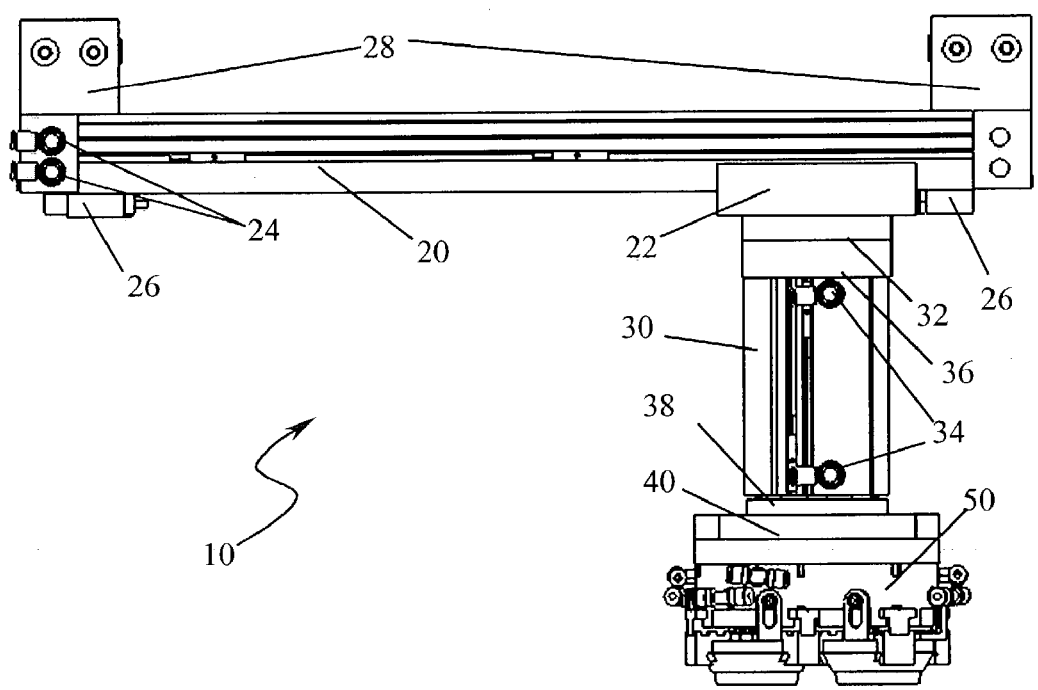
FIG. 2 is a front view of the apparatus of FIG. 1.
Figure 3:
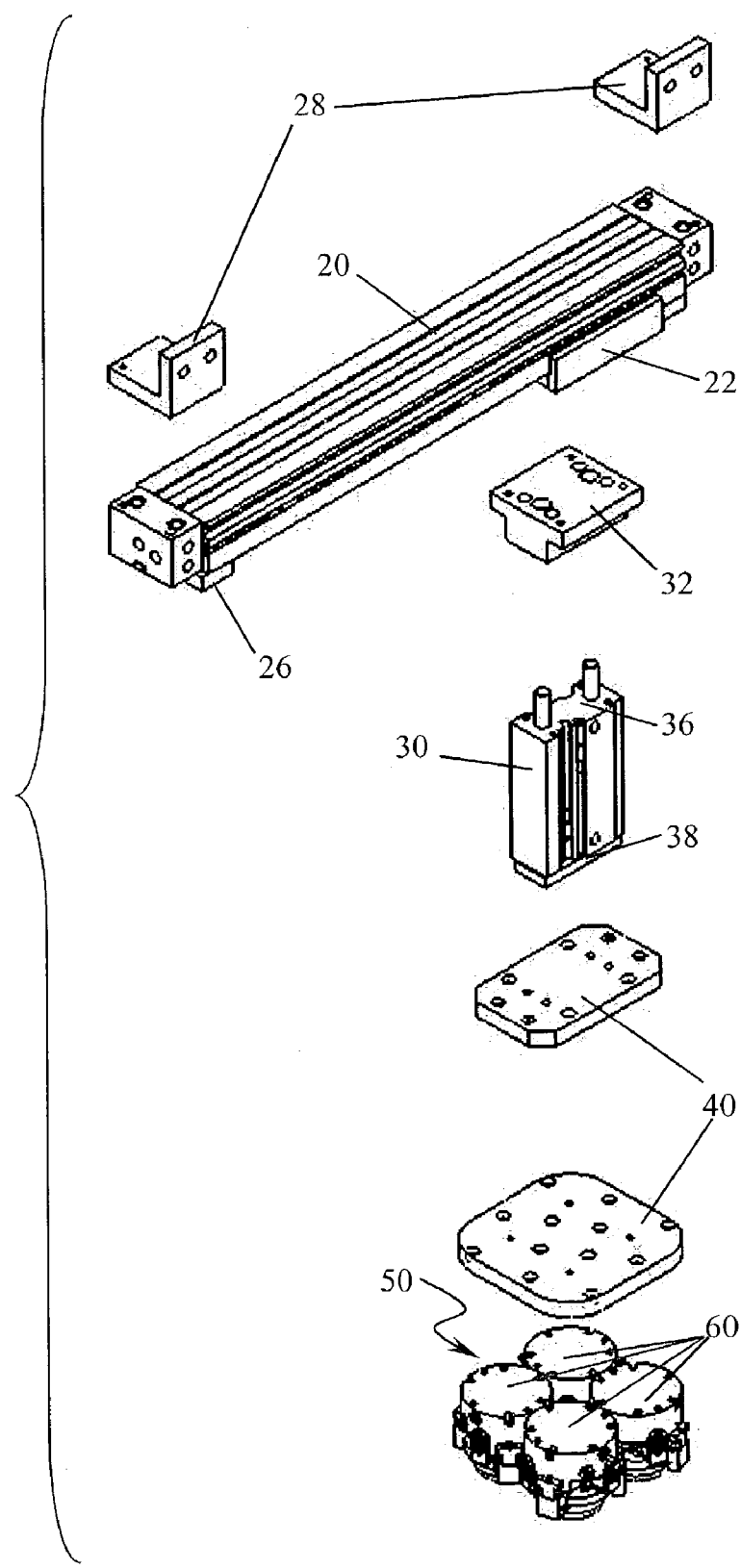
FIG. 3 is an explosive view of the components incorporated in the apparatus of FIG. 1.

FIGS. 1–3 illustrate an example of the automated flash/overflow removal system 10 ("AFORS") of the present invention, comprising a mechanical joint rodless cylinder 20, a compact guided cylinder 30, and a gripping assembly 50. Rodless cylinder 20 is connected to a first pressure source (not shown) such as a gas tank or cylinder via inlet/outlet 24, which provides pneumatic power to drive a piston table 22 of rodless cylinder 20 in between a pair of end stops 26. Piston table 22 is connected to the internal piston of rodless cylinder 20 by means of a magnetic or mechanical coupling system, and serves as an external carriage. Positioning of piston table 22 along rodless cylinder 20 is controlled by two sensors embedded within rodless cylinder 20. A set of anchoring plates 28 is used to mount rodless cylinder 20 directly onto a golf ball production line (not shown here).

Guided cylinder 30 is mounted onto table 22 of rodless cylinder 20 at a stationary end 36 via an anchoring member 32. Gripping assembly 50 is mounted onto a mobile (extendable) end 38 of guided cylinder 30 via a set of anchoring plates 40. Guided cylinder 30 is connected to a second pressure source (not shown) such as a gas tank or cylinder via inlet/outlet 34, which provides pneumatic power to guided cylinder 30 and allows mobile end 38 to extend out of and retract into guided cylinder 30. Guided cylinder 30 utilizes a guide rod mounted in parallel with the piston rod to provide stable, non-rotating, high side load performance. The vertical positioning of mobile end 38 is controlled by a pair of sensors embedded within guided cylinder 30. Guided cylinder 30 may be replaced by any other cylinders or actuators having similar capabilities, may be operated using an electronic motor or other systems, and may be powered by mechanical, electrical, hydraulic, or other means.

The combination of rodless cylinder 20 and guided cylinder 30 provides the attached gripping assembly 50 with two-dimensional maneuverability. One of ordinary skill in the art would understand that linear rodless cylinder 20, guided cylinder 30, or combination of the two may be substituted with other means or automated devices having at least one degree of freedom (at least 1-axis control) and being capable of spatial transport. Alternative devices suitable for the AFORS of the present invention may be driven by pneumatic power, hydraulic power, magnetic power, mechanical power, or combinations thereof, and include, but are not limited to, robotic arms, crane-like devices comprising rotary actuators, various cylinders, rotators, sliders, or actuators (linear, rotary, or multi-motion), or combinations thereof capable of one-dimensional, two-dimensional, or three-dimensional movements. Preferable rodless cylinders 20 and guided cylinders 30 are supplied by SMC Corporation of America in Indianapolis, Ind. Other comparable cylinders or alternatives are also commercially available to the skilled in the art.

Figure 4:
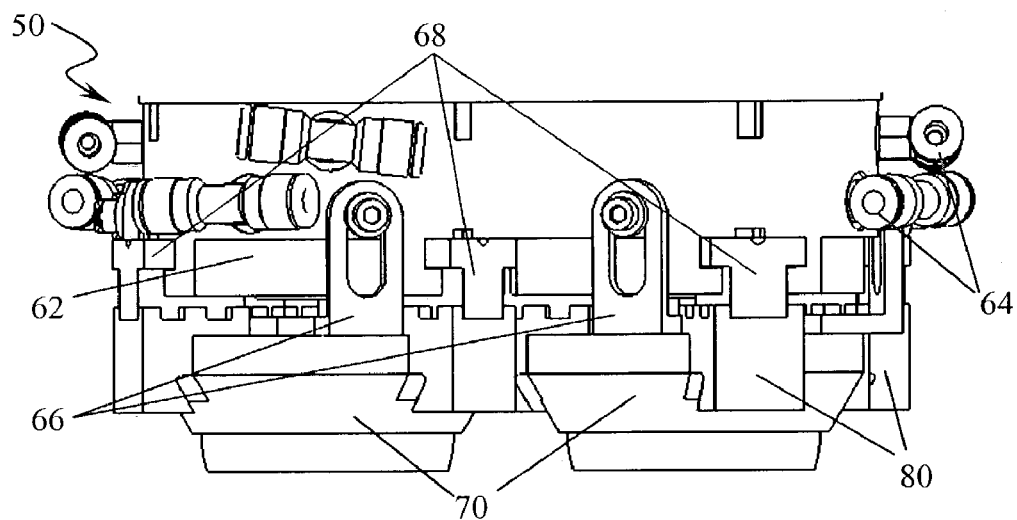
FIG. 4 is a front view of a gripping assembly.
Figure 5:
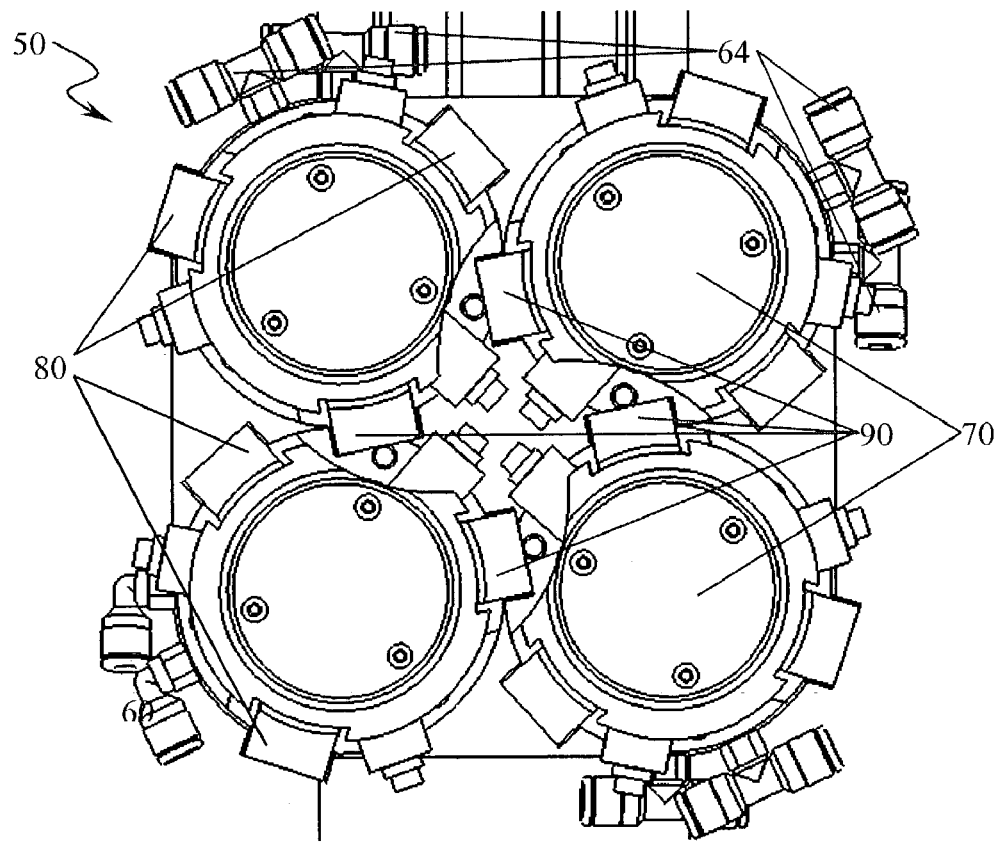
FIG. 5 is a bottom view of the gripping assembly of FIG. 4.

Gripping assembly 50 comprises a plurality of gripping members 60, arranged in a format so that each gripping member 60 corresponds to a bottom mold cavity 110 in a bottom mold platen 100. Referring to FIGS. 4 and 5, each gripping member 60 comprises a substantially cylindrical gripper body 62 having three jaws 68 integrated therein at a flat end, the jaws 68 being spaced substantially equilaterally; a spring actuated part ejector 66 coupled to gripper body 62 covering partially the same flat end without overlapping with jaws 68; two fingers 80 and a third finger 90 each mounted on a jaw 68; a core post 70 mounted on ejector 66 opposite to gripper body 62; and a pair of inlet/outlet 64 fashioned on the curved side of gripper body 62. This concentric stacking of gripper body 62, ejector 66, and core post 70 allows the spring(s) of ejector 66 to be compressed (pre-loaded) when core post 70 moves toward gripper body 62, and extended (un-loaded) when core post 70 moves away from gripper body 62. Fingers 80 and 90 are mounted such that they are adjacent to the perimeter of core post 70 and are substantially equilateral as well. Designated pair of inlet/outlet 64 is connected to a third pressure source (not shown) such as a gas tank or cylinder to provide pneumatic power to jaws 68 and allow parallel and synchronous operation of fingers 80 and 90 as described below. Materials for components of gripping member 60 are preferably metals, treated metals, metal alloys, ceramics, or durable plastics. Parallel grippers encompassing a gripper body 62 made of hardcoated aluminum with three jaws 68 made of hardened steel and a part ejector 66 made of steel are supplied by PHD, Inc. of Fort Wayne, Ind. Other comparable grippers or alternatives are also commercially available and known to the skilled in the art.

Figure 6:
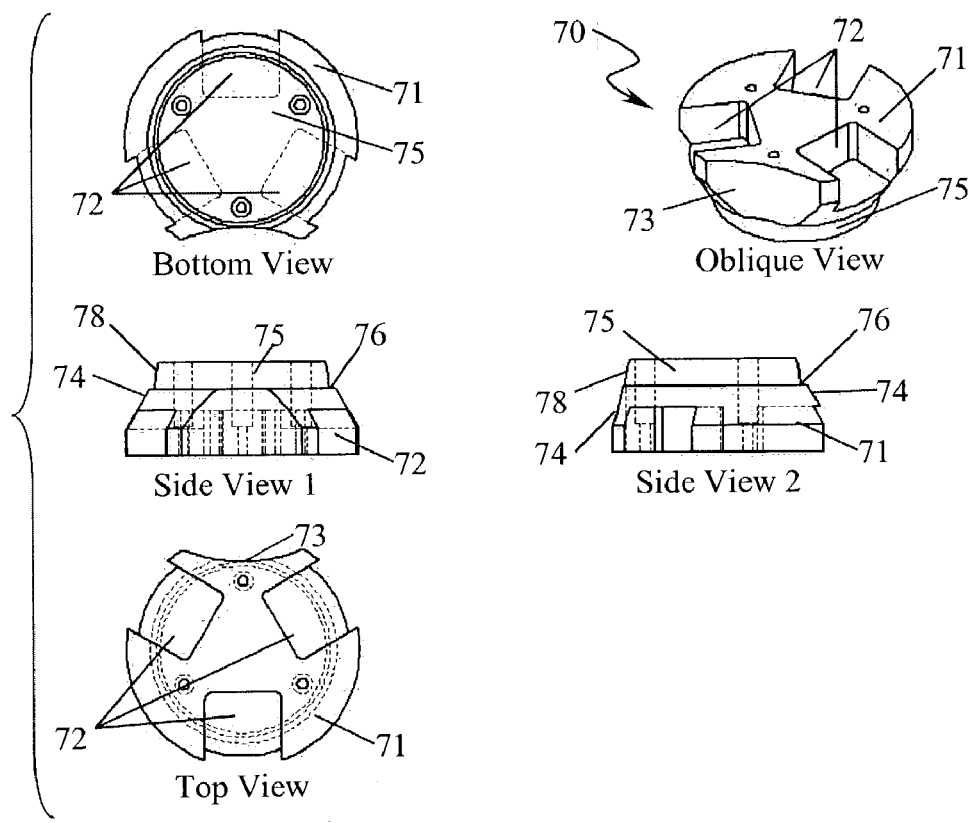
FIG. 6 is a collection of aspect views of a core post.
Figure 7:
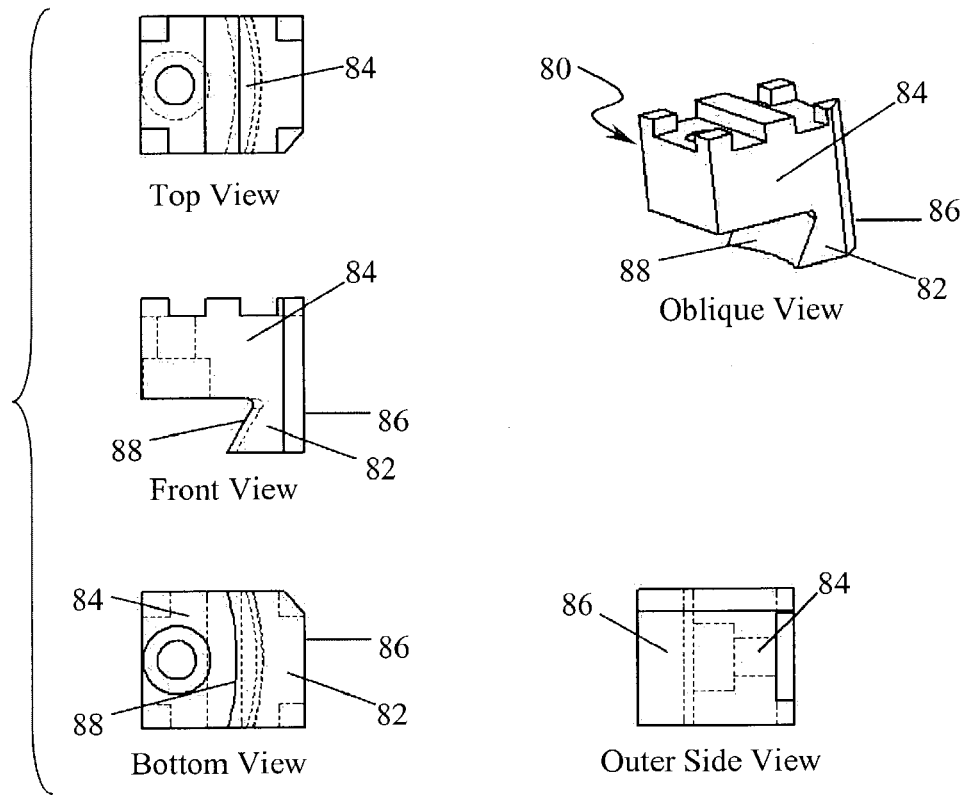
FIG. 7 is a collection of aspect views of a finger.
Figure 8:
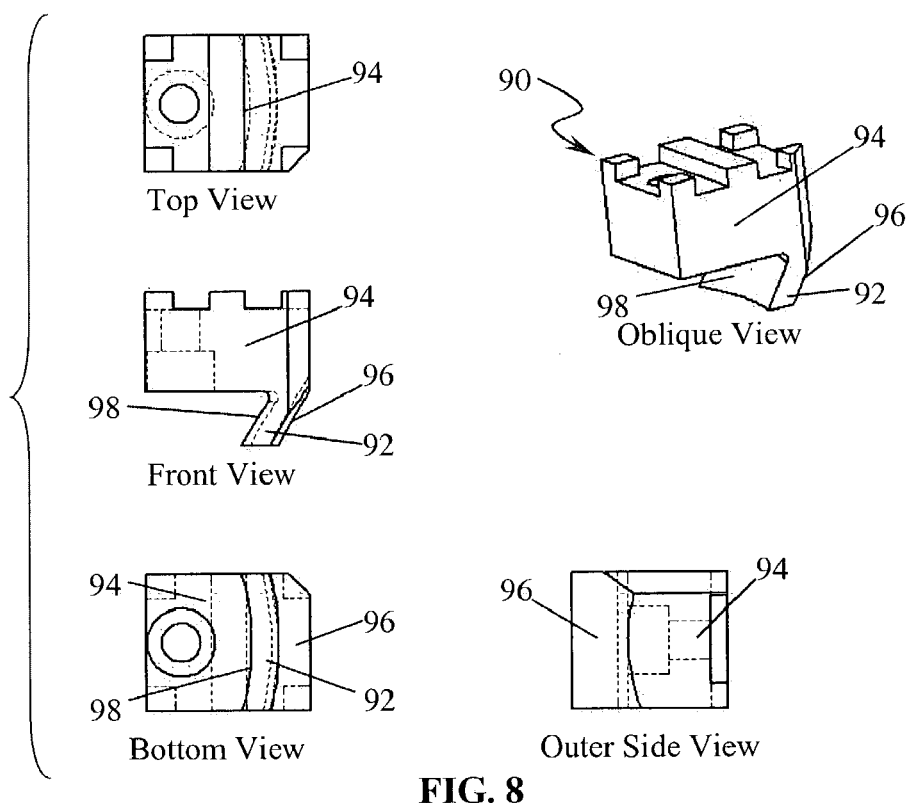
FIG. 8 is a collection of aspect views of another finger.

Referring to FIGS. 6–8, the spatial configurations of core post 70 and fingers 80 and 90 are illustrated. Core post 70, as shown in FIG. 6, has a gripping portion 71 and an alignment portion 75. Gripping portion 71 is generally tapered downward, preferably inverted frustoconical in shape, having three recesses 72 on its upper periphery to accommodate portions of fingers 80 and 90. A concave side portion 73 is fashioned to accommodate a neighboring gripping member 60. A lower outer surface 74 is substantially tapered downward, preferably inverted frustoconical, and is in contact with a flash/overflow 200 during flash/overflow retrieval and removal. Alignment portion 75 is concentrically recessed from the bottom perimeter of gripping portion 71, leaving a brink 76 about alignment portion 75. Brink 76 is fashioned to be complementary to top rim 112 of bottom mold portion 110, as described below. An outer surface 78 of alignment portion 75 is fashioned to have a spherical contour that fits snuggly with an upper inner wall 116 of bottom mold cavity 110.

Fingers 80, as shown in FIG. 7, each have a tip portion 82 and a body portion 84. Body portion 84 is shaped to fit loosely in one of the recesses 72 of core post 70, so that finger 80 can move radially with respect to a longitudinal axis C of gripping member 60 (see FIG. 9). Tip portion 82 has a flat outer surface 86 and a substantially inverted frustoconical concave inner surface 88. A first radius of inner surface 88 can be less than a second radius of lower outer surface 74 of core post 70 at equal altitude, but preferably greater than or equal the second radius. Most preferably, the curvature of inner surface 88 is complementary to or slightly less arched than lower outer surface 74 of core post 70. Finger 90, as shown in FIG. 8, has a tip portion 92 and a body portion 94. Body portion 94 is shaped to fit loosely in one of the recesses 72 of core post 70, so that finger 90 can move radially with respect to axis C (see FIG. 9). Tip portion 92 has a substantially inverted frustoconical convex outer surface 96 and a substantially inverted frustoconical concave inner surface 98. A first radius of inner surface 98 can be less than a second radius of lower outer surface 74 of core post 70 at equal altitude, but preferably greater than or equal the second radius. Most preferably, the curvature of inner surface 98 is complementary to or slightly less arched than lower outer surface 74 of core post 70. The curvature of outer surface 96 is preferably in parallel with that of inner surface 98. Fingers 80 and 90 are further shaped to accommodate neighboring gripping members 60 so that each can operate properly without hindrance. For example, an outer vertical edge of fingers 80 and 90 are flattened.

Figure 9:
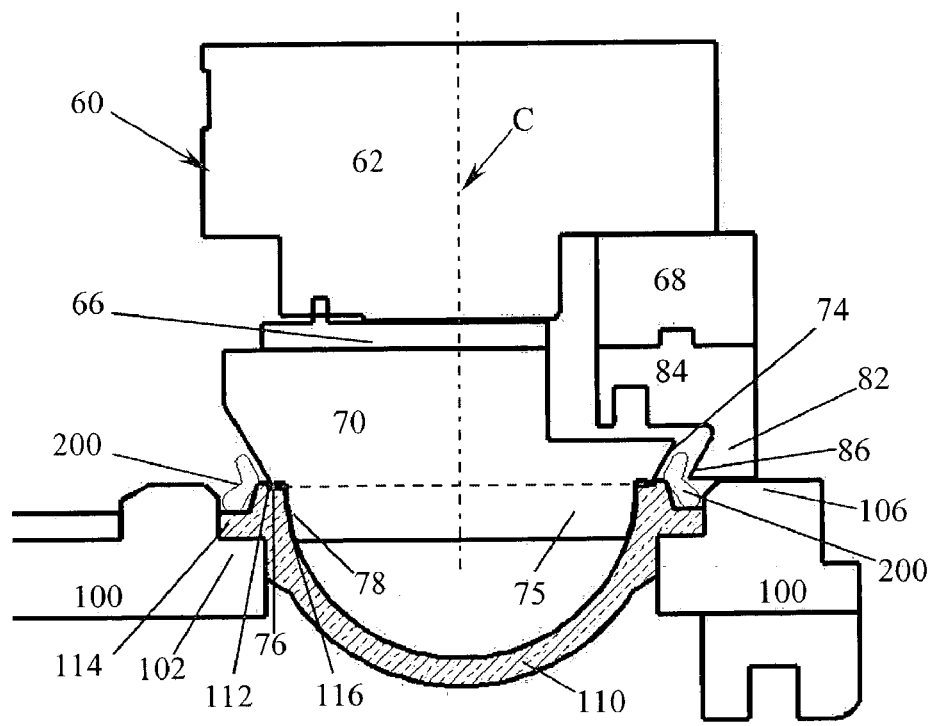
FIG. 9 is a cross-sectional view of a gripping member sitting on a bottom mold portion to retrieve the flash/overflow.
Figure 10:
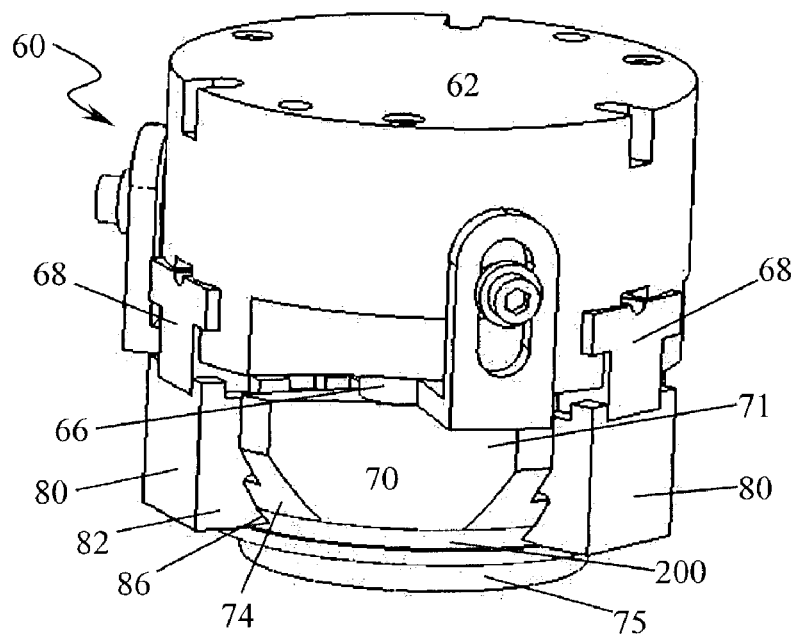
FIG. 10 is a prospective view of a gripping member engaged with the flash/overflow.
Figure 11:
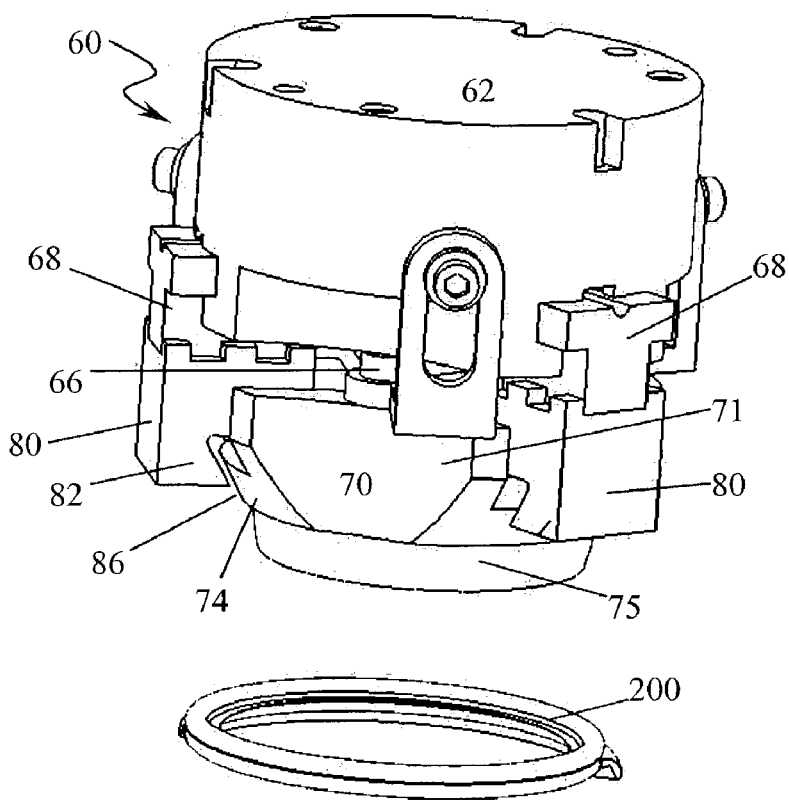
FIG. 11 is a prospective view of a gripping member expelling the flash/overflow.
Figure 12:
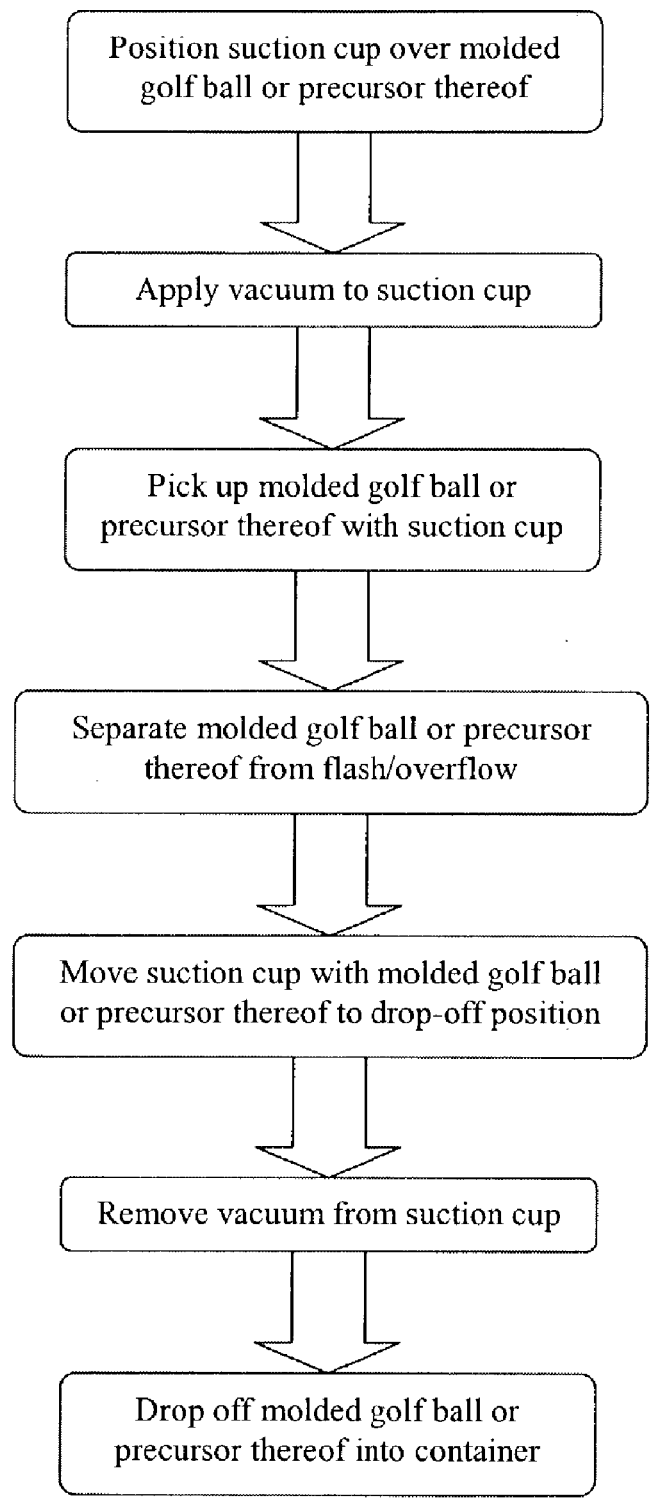
FIG. 12 is a flow chart of removal of molded golf ball or precursor thereof from the molded portion prior to removal of flash/overflow.

FIGS. 9–11 shows the interoperation between the elements of the AFORS. FIG. 9 depicts the retrieval of flash/overflow 200 by gripping member 60 from a bottom mold portion 110. Bottom mold portion 110 is cup-shaped cavity, preferably substantially spherical, having a top rim 112 and a ledge 114 extending horizontally outward slightly beneath top rim 112. Preferably both top rim 112 and ledge 114 are annular in shape. Ledge 114 sits on a flange 102 of bottom mold platen 100, and bottom mold portion 110 is secured onto platen 100 with any means such as screws. During a molding process, flash/overflow 200, typically substantially annular, is formed about top rim 112 of bottom mold portion 110 and rests on ledge 114. After the molding process, bottom mold portion 110 is separated from other mold portions that form the mold cavity. Because of gravity interaction, the molded object such as golf balls or precursor thereof and flash/overflow 200 are usually left in or on bottom mold portion 110. The molded object is preferably removed from bottom mold portion 110 first, using methods such as cup suction. The AFORS is then engaged to remove flash/overflow 200 from bottom mold portion 110.

First, gripping assembly 50 is transported by rodless cylinder 20 from a starting position to an alignment position directly over bottom mold platen 100. Guided cylinder 30 then extends downward to move gripping assembly 50 toward bottom mold platen 100. Because alignment portion 75 of core post 70 has a circular and flat bottom surface that is concentric to and less in size than the top opening area of bottom mold portion 110, alignment portion 75 is effectively inserted into bottom mold portion 110. Referring to FIG. 9, outer surface 78 of alignment portion 75 is in contact with upper inner wall 116 of bottom mold portion 110, and brink 76 of gripping portion 71 is in contact with top rim 112 of bottom mold portion 110. This construction allows core post 70 to perfectly self-align or center with its corresponding bottom mold portion 110. Guided cylinder 30 is extended further to fully compress part ejector 66 between gripper body 62 and core post 70 of gripping member 60 (pre-loading). Pneumatic power supplied to guided cylinder 30 is properly regulated to be enough to achieve full compression of part ejector 66, but not too much to cause excessive wear between core post 70 and bottom mold portion 110.

In this pre-loaded position, fingers 80 (shown) and 90 (not shown) are located so that tip 82 and 92 just clear top surface 106 of bottom mold platen 100 without actual contact. Fingers 80 and 90 are moved concentrically toward axis C until inner surfaces 88 and 98 are pressed firmly against flash/overflow 200, which is in turn pressed firmly against lower outer surface 74 of gripping portion 71 of core post 70. In this way, flash/overflow 200 is securely held between fingers 80 and 90 and core post 70. Immobilized fingers 80 and 90 keep ejector 66 compressed between gripper body 62 and core post 70 through flash/overflow 200 and lower outer surface 74 of core post 70. Movements of fingers 80 and 90 are controlled through jaws 68 on which they are mounted. Such movements are preferably synchronized so that fingers 80 and 90 operate in parallel, or optionally the jaws 68 are independently controlled.

FIG. 10 illustrates gripping member 60 holding flash/overflow 200. After gripping members 60 retrieve flash/overflow 200, guided cylinder 30 retracts its mobile end 38 to bring gripping assembly 50 upward and away from bottom mold platen 100. Rodless cylinder 20 is engaged to move guided cylinder 30 and gripping assembly 50 from the alignment position back to a pre-determined position, preferably the starting position. FIG. 11 shows the discharge of flash/overflow 200 from gripping member 60. Fingers 80 and 90 of gripping member 60 are moved concentrically outward to loose their grip on flash/overflow 200. Part ejector 66 decompresses to propel core post 70 downward, effectively expelling flash/overflow 200 off from core post 70. The inverted frustoconical profile of lower outer surface 74 and recessed alignment portion 75 eliminate any friction that may retain flash/overflow 200 during expulsion. Flash/overflow 200 is preferably dropped into a chute and collected in a waste bin for disposal. Gripping members 60 are now ready for further flash/overflow retrieval.

To improve efficiency and reduce wear of the AFORS of the present invention, it is preferred to move multiple bottom mold platens 100 carrying flash/overflow 200 through a stationary construction that houses the AFORS. Mold platens 100 are preferably placed on a conveyor (with rolling pins or belt) to pass through the AFORS. Any other moving means known to the skilled in the art may be used as well. Two or more conveyor lines are arranged in parallel, each with its own designated AFORS and independent operation, to multiply processing capacity. Preferably, one conveyor carries top mold platens, and the other conveyor carries bottom mold platens.

An automated inspection system is optionally employed to check the presence of flash/overflow 200 on each bottom mold portion 110 prior to engaging the AFORS. In one embodiment, a cylinder is lowered over mold portion 110 toward a pre-determined position just above ledger 114. When flash/overflow 200 is present, it prevents the cylinder from reaching the pre-determined position. The AFORS is in turn signaled for flash/overflow removal. When flash/overflow 200 is absent, the cylinder does reach the pre-determined position, and signals the AFORS not to engage for removal. In another embodiment, the inspection system may employ an imaging system that differentiates optical differences (color, reflection, etc.) between flash/overflow 200 and mold portion 110, thereby detecting the presence of flash/overflow 200. In a further embodiment, a laser diode-based or ultrasound-based distance measurement system can be used to verify the presence of flash/overflow 200. When flash/overflow 200 is absent on a particular bottom mold portion 110, the corresponding gripping member 60 is signaled not to engage for retrieval, thereby reducing wear. Alternatively, the AFORS is signaled to be idol only when flash/overflow 200 is missing from all of the mold portions 110 on the same mold platen 100.

Material wear mostly occurs in core post 70 and fingers 80 and 90, because of their direct and repeated contact with flash/overflow 200. Durable materials are desired to construct these components, so as to reduce replacement cost and related downtime. Suitable materials for core post 70 and fingers 80 and 90 can be metals or plastics, having a material hardness and a flexural modulus greater than that of flash/overflow 200, and a low coefficient of friction so that flash/overflow 200 does not stick during expulsion. The material hardness is preferably greater than about 55 Shore D, more preferably about 60 Shore D to about 95 Shore D. The coefficient of friction is preferably less than about 0.4, more preferably about 0.05 to about 0.3. The flexural modulus is preferably greater than about 70,000 psi, more preferably about 100,000 psi to about 4,500,000 psi. Fingers 80 and 90 preferably have a tensile strength of greater than about 5,000 psi, more preferably greater than about 10,000 psi. Exemplary plastic materials for core post 70 include, but are not limited to, thermoplastics and thermosets such as acetal homopolymers and copolymers, polytetrafluoroethylene, polyperfluoroalkoxyethylene, fluorinated ethylene propylene, ethylene tetrafluoroethylene, ethylene chloro-trifluoroethylene, polyvinylidiene fluoride, polyketones, polyetheretherketones, polyamides, polyamideimides, polyetherimides, high density polyethylene, polyphenylene sulfide, ultra-high-molecular-weight polyethylene, and all plastics available from Quadrant Engineering Plastic Products of Reading, Pa. In a preferred embodiment, core post 70 is made from high density polyethylene, and fingers 80 and 90 are made from acetal homopolymer (Delrin® by DuPont).

The pneumatic pressure supplied to the AFORS can be any pressure high enough to allow all the operations described above. Preferably, the pneumatic pressure is about 90 psi. Changes in the pressures that lead to all mechanical movements in the AFORS are regulated by single and/or double solenoid valves that are disposed along the hoses that connect the gas tanks or cylinders to the inlets/outlets. Other designs and features suitable for the AFORS are well known to one of ordinary skill in the art, and can be incorporated into the present invention whenever appropriate.

All patents and patent applications cited in the foregoing text are expressly incorporated herein by reference in their entirety.

The invention described and claimed herein is not to be limited in scope by the specific embodiments herein disclosed, since these embodiments are intended as illustrations of several aspects of the invention. Any equivalent embodiments are intended to be within the scope of this invention. Indeed, various modifications of the invention in addition to those shown and described herein will become apparent to those skilled in the art from the foregoing description. Such modifications are also intended to fall within the scope of the appended claims.

What is claimed is:

1. A method of removing a flash integrally attached to a molded golf ball or precursor thereof on a mold portion, comprises:

positioning a suction cup over the molded golf ball or precursor thereof;

applying a vacuum suction to the suction cup;

taking hold of the molded golf ball or precursor thereof with the suction cup while retaining the flash on the mold portion with a rim of the suction cup;

separating the molded golf ball or precursor thereof from the integrally attached flash;

moving the suction cup with the molded golf ball or precursor thereof to a predetermined position;

removing the vacuum suction from the suction cup;

allowing the molded golf ball or precursor thereof to fall under gravity into a container for collection;

moving a gripping assembly comprising at least one gripping member by an automated device from a starting position toward the mold portion;

engaging the gripping member to grip the flash;

moving the gripping assembly and the flash by the automated device away from the mold portion to an ejection position; and expelling the flash from the gripping member.

2. A method of removing a flash integrally attached to a molded golf ball or precursor thereof on a mold portion, comprising:

removing the molded golf ball or precursor thereof while retaining the flash on the mold portion;

moving a gripping assembly comprising at least one gripping member from a starting position to an alignment position directly over the mold portion;

docking the gripping assembly onto the mold portion;

engaging the gripping member to grip the flash;

moving the gripping assembly and the flash away from the mold portion to an ejection position; and expelling the flash from the gripping member.

3. The method of claim 2 wherein the gripping assembly is moved pneumatically.

4. The method of claim 2 wherein the step of docking the gripping assembly further comprises:

aligning the gripping member with the mold portion; and loading the gripping member with a compressed energy for the step of expelling the flash.

5. The method of claim 4, wherein the step of aligning the gripper member further comprises:

lowering an alignment portion of the gripping member into a cavity of the mold portion; and pressing a brink of the gripping member against a rim of the mold portion.

6. The method of claim 5, wherein the alignment portion has a substantially spherical side surface and a substantially flat bottom surface.

7. The method of claim 5 wherein the brink and the rim are both substantially annular, and the brink is no wider than the rim.

8. A method of removing a flash integrally attached to a molded golf ball or precursor thereof on a mold portion, comprises:
- removing the molded golf ball or precursor thereof while retaining the flash on the mold portion;
- moving a gripping assembly comprising at least one gripping member by an automated device from a starting position toward the mold portion;
- positioning a plurality of perimeter clamping portions of the gripping member at a first side of the flash;
- positioning a center clamping portion of the gripping member at a second side of the flash;
- moving the plurality of perimeter clamping portions towards the center clamping portion;
- clamping the flash by the first and second sides between the plurality of perimeter clamping portions and the center clamping portion;
- moving the gripping assembly and the flash by the automated device away from the mold portion to an ejection position; and
- expelling the flash from the gripping member.

9. The method of claim 8, wherein the plurality of perimeter clamping portions comprises between 2 to 10 fingers disposed substantially uniformly about the center clamping portion.

10. The method of claim 8 wherein the step of moving the plurality of perimeter clamping portions comprises pneumatically powering the perimeter clamping portions in a concentric and synchronous manner.

11. The method of claim 8, wherein the center clamping portion is substantially tapered to facilitate the discharge of the flash from the gripping member.

12. The method of claim 8 wherein:
- each of the plurality of perimeter clamping portions has an inward surface facing the center clamping portion;
- the inward surface has a concave curvature;
- the center clamping portion has an outward surface facing the perimeter clamping portions;
- the outward surface has a convex curvature; and
- the concave curvature is flatter than or complementary to the convex curvature.

13. The method of claim 12, wherein the convex curvature of the outward surface of the center clamping portion is inverted frustoconical.

14. A method of removing a flash integrally attached to a molded golf ball or precursor thereof on a mold portion, comprises:
- removing the molded golf ball or precursor thereof while retaining the flash on the mold portion;
- moving a gripping assembly comprising at least one gripping member by an automated device from a starting position toward the mold portion;
- engaging the gripping member to grip the flash;
- moving the gripping assembly and the flash by the automated device away from the mold portion to an ejection position;
- disengaging the gripping member from the flash;
- releasing a compressed spring mechanism in the gripping member to eject the flash; and
- allowing the flash to fall under gravity into a container for collection.

15. The method of claim 14, wherein the automated device is capable of one dimensional motions, two dimensional motions, three dimensional motions, linear motions, rotational motions, or combinations thereof.

16. A method of removing a flash integrally attached to a molded golf ball or precursor thereof on a mold portion, comprises:
- removing the molded golf ball or precursor thereof while retaining the flash on the mold portion;
- moving a gripping assembly by an automated device from a starting position toward the mold portion, wherein the gripping assembly comprises 2 to about 20 gripping members arranged in a one-dimensional or two-dimensional array, and the gripping members are independently or synchronously operated;
- engaging the gripping member to grip the flash;
- moving the gripping assembly and the flash by the automated device away from the mold portion to an ejection position; and
- expelling the flash from the gripping member.

17. The method of claim 16 wherein the gripping assembly comprises 4 co-planar gripping members arranged in a 2×2 array.

* * * * *